US012782254B2

(12) United States Patent
Yang et al.

(10) Patent No.: US 12,782,254 B2
(45) Date of Patent: Nov. 3, 2026

(54) VERTICAL FATIGUE TEST DEVICE AND METHOD FOR DYNAMIC SUBMARINE CABLE BASED ON TOPOLOGY OPTIMIZATION DESIGN FRAMEWORK

(71) Applicant: Harbin Engineering University, Harbin City (CN)

(72) Inventors: Zhixun Yang, Harbin City (CN); Yucheng Lu, Harbin City (CN); Yandong Mao, Harbin City (CN); Hualin Wang, Harbin City (CN); Jun Yan, Harbin City (CN); Xu Yin, Harbin City (CN); Gang Wang, Harbin City (CN); Maoyan Yan, Harbin City (CN); Weixuan Xie, Harbin City (CN); Qi Le, Harbin City (CN); Qingzhen Lu, Harbin City (CN); Hailong Lu, Harbin City (CN); Peng Cao, Harbin City (CN); Geng Tian, Harbin City (CN); Yaohua Fan, Harbin City (CN); Jinlong Chen, Harbin City (CN)

(73) Assignee: Harbin Engineering University, Harbin (CN)

( * ) Notice: Subject to any disclaimer, the term of this patent is extended or adjusted under 35 U.S.C. 154(b) by 241 days.

(21) Appl. No.: 18/794,344

(22) Filed: Aug. 5, 2024

(65) Prior Publication Data

US 2025/0123193 A1 Apr. 17, 2025

(30) Foreign Application Priority Data

Oct. 12, 2023 (CN) ........................ 202311321105.2

(51) Int. Cl.
*G01N 3/32* (2006.01)

(52) U.S. Cl.
CPC ....... *G01N 3/32* (2013.01); *G01N 2203/0073* (2013.01)

(58) Field of Classification Search
None
See application file for complete search history.

(56) References Cited

U.S. PATENT DOCUMENTS 10,088,387 B2 * 10/2018 Jin ...................... G01M 13/027
11,002,649 B1 * 5/2021 Boyce ...................... G01N 3/04
2021/0182455 A1 * 6/2021 Bandara .................. G06F 30/20

* cited by examiner

*Primary Examiner* — Eric S. McCall
*Assistant Examiner* — Nigel H Plumb
(74) *Attorney, Agent, or Firm* — Terry M. Sanks, Esq.; Beusse Sanks, PLLC

(57) ABSTRACT

Provided are a vertical fatigue test device for a dynamic submarine cable based on a topology optimization design framework, and a method thereof. The device includes a bending table, a main framework, the dynamic submarine cable, a connecting hinge, a supporting frame, a bottom plate, and a tension actuator; the bending table is mounted on an upper plate at a top of the main framework, and the main framework, the supporting frame, and the tension actuator are mounted on the bottom plate; an upper end of the dynamic submarine cable is connected with the bending table through a clamping mechanism; each of a left end and a right end of the bending table is connected with a bending actuator; the bending actuators are connected to the upper plate and are configured to achieve reciprocating swinging of the bending table.

18 Claims, 3 Drawing Sheets

VERTICAL FATIGUE TEST DEVICE AND METHOD FOR DYNAMIC SUBMARINE CABLE BASED ON TOPOLOGY OPTIMIZATION DESIGN FRAMEWORK

CROSS-REFERENCE TO RELATED APPLICATION

This patent application claims the benefit and priority of Chinese Patent Application No. 202311321105.2 filed with the China National Intellectual Property Administration on Oct. 12, 2023, the disclosure of which is incorporated by reference herein in its entirety as part of the present application.

TECHNICAL FIELD

The present disclosure relates to the technical field of fatigue test equipment, and in particular, to a vertical fatigue test device and method for a dynamic submarine cable based on a topology optimization design framework.

BACKGROUND

Nowadays, oceans are the largest energy storage places in the world. Countries in the world are focusing on the development of marine resources. During the development of marine resource extraction projects, the scientific and technological level of all the countries is also increasingly improved. People are no longer limited to the exploitation of the marine resources in shallow water and have begun to develop various types of new exploitation equipment to explore and research resources in deep water. There are mainly two types of new exploitation equipment: a fixed platform exploitation system and a mobile platform exploitation system. A floating offshore wind power platform is connected to a floating wind turbine and the equipment needs to be powered in the seabed through a dynamic submarine cable. The floating offshore wind power platform is a key equipment for achieving development, long-distance transportation, and large-scale utilization of wind energy resources in near and far seas. Due to long-term operations in a marine environment, the dynamic submarine cable is prone to fatigue failures under the influence of a relative motion between ocean waves and a floating body. Therefore, it is necessary to test the fatigue strength of the dynamic submarine cable during production and manufacturing.

At present, the dynamic submarine cable plays a decisive role in offshore oil and gas development, in other words, the dynamic submarine cable is necessary for transportation by offshore oil and gas pipelines. The external loads generated by marine current cause the dynamic submarine cable to be subjected to cyclic loads. To avoid excessive bending of the dynamic submarine cable due to the loads, a certain degree of stiffness may be maintained both inside and outside the dynamic submarine cable. Generally, the dynamic submarine cable is of a multi-layer helical wound composite structure, which can not only improve the strength and stiffness of the dynamic submarine cable, but also ensure the bending compliance ability of the dynamic submarine cable. Because of the nonlinear geometric characteristics caused by its structure, it is difficult to obtain an accurate result using conventional numerical values and theoretical methods. There is an urgent need for a fatigue test device that can simulate a mechanical behavior of a submarine cable caused by a relative motion between marine current and a floating body. So far, only a few countries in the world, such as Norway and Brazil, have conducted fatigue life tests for simulating an in-place working condition of the dynamic submarine cable. Although China has advanced the research and manufacturing of the dynamic submarine cable in recent years, there is a relative shortage of research on fatigue test devices. There is an urgent need for a breakthrough in the research and manufacturing of a vertical fatigue test device. Moreover, a horizontal fatigue test device cannot completely simulate the in-place working condition of the dynamic submarine cable, as the accuracy of test data is affected by the gravity of the dynamic submarine cable itself during the test. In order to obtain more accurate test results, the present disclosure designs a vertical fatigue test device for a dynamic submarine cable based on a topology optimization design framework.

SUMMARY

According to the technical problems mentioned above, a vertical fatigue test device and method for a dynamic submarine cable based on a topological optimization design frame are provided.

The present disclosure provides the following technical solutions:

A vertical fatigue test device for a dynamic submarine cable based on a topology optimization design framework includes a bending table, a main framework, the dynamic submarine cable, a connecting hinge, a supporting frame, a bottom plate, and a tension actuator. The bending table is mounted on an upper plate at a top of the main framework, and the main framework, the supporting frame, and the tension actuator are mounted on the bottom plate; the dynamic submarine cable is vertically arranged in an inner space of the main framework.

An upper end of the dynamic submarine cable is connected with the bending table through a clamping mechanism; each of a left end and a right end of the bending table is connected with a bending actuator; the bending actuator is connected to the upper plate and is configured to achieve reciprocating swinging of the bending table, so as to achieve bending loading on the dynamic submarine cable.

A lower end of the dynamic submarine cable is connected with the connecting hinge; the connecting hinge is slidably connected to the supporting frame; and the tension actuator is connected with the connecting hinge and is configured to achieve a displacement motion of the connecting hinge, so as to achieve tension loading on the dynamic submarine cable.

Further, the bending table is of a solid-web framework structure and is connected with the bending actuator through a bending mechanism; and the bending actuator is connected with a hinged support on the main framework.

Further, the bending mechanism includes a connecting rod and a rack and gear mechanism; the gear and rack mechanism includes at least a gear and a rack; one end of the connecting rod is connected to the bending table through a first bolt, and another end of the connecting rod is connected to the rack through a second bolt; the rack meshes with the gear; the gear is connected to the bending actuator; and a lower end of the gear and rack mechanism is fixed to the upper plate of the main framework by screws.

Further, an upper part of the connecting hinge is connected with the lower end of the dynamic submarine cable through a submarine cable fixing device; the connecting hinge includes a hinge hole, a hinged support, a lifting platform, and a labor-saving pulley group; the lifting platform is slidably connected to the supporting frame; the hinged support is fixed to the lifting platform; the hinge hole is formed in the hinged support; the hinge hole is connected with the submarine cable fixing device through an internal matched bolt; a lower part of the lifting platform is connected with the labor-saving pulley group; the labor-saving pulley group includes two pulleys and a steel wire rope; one end of the steel wire rope is fixedly connected to a lower pulley of the two pulleys and is wound on the two pulleys, and another end of the steel wire rope is connected to the tension actuator; an upper pulley of the two pulleys is connected with the lifting platform; the lower pulley is connected with the bottom plate.

The tension actuator is configured to control the labor-saving pulley group to achieve a displacement motion of the connecting hinge, so as to achieve the tension loading on the dynamic submarine cable. Meanwhile, the labor-saving pulley group is configured to compensate for a displacement generated at the lower end of the dynamic submarine cable when the bending table swings.

Further, the bending table is connected to the main framework through a shaft; a bearing pedestal is welded to the upper plate of the main framework; a bearing is mounted inside the bearing pedestal; the bearing is in fitting connection to the shaft connected to the bending table;

an upper end of the bending table is provided with a cover plate; the cover plate is fixed to the bending table by multiple screws; and the dynamic submarine cable is able to be mounted and removed by opening the cover plate.

Further, an anti-bending device is mounted at a connection between the dynamic submarine cable and the bending table; the anti-bending device is of a three-section structure; and a material of the three-section structure includes polyurethane and epoxy resin.

Further, both the bending actuator and the tension actuator are hydraulic actuators.

Further, the main framework is welded by open-cut profile steel and is composed of a triangular truss structure; the main framework is overall a tower-like triangular truss supporting structure.

Multiple rows of second bolt holes and multiple rows of third bolt holes are formed in a lower end of the main framework; the main framework is connected with the bottom plate by bolts that are in fitting connection into the second bolt holes and the third bolt holes; and the supporting frame is connected with the bottom plate through a bolt that is in fitting connection into the first bolt hole.

Further, the vertical fatigue test device for the dynamic submarine cable based on the topology optimization design framework includes an information monitoring system, where the information monitoring system includes at least sensors, cameras, and data analysis software; the sensors are mounted on a surface of the dynamic submarine cable; strain gauges are further mounted on the surface of the dynamic submarine cable; the sensors and the strain gauges are equidistantly pasted on the dynamic submarine cable and are electrically connected with an upper computer; test data is acquired and transmitted to the upper computer through the strain gauges and the sensors; the data analysis software is configured to analyze a stress and fatigue failure of the dynamic submarine cable; cameras are mounted at an upper end and a lower end of the main framework, and real-time working conditions and changes of the dynamic submarine cable and a fatigue test machine are recorded through the cameras.

The present disclosure further provides a test method of a vertical fatigue test device for a dynamic submarine cable based on a topology optimization design framework, including the following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull the labor-saving pulley group so as to ensure that the dynamic submarine cable is in a vertical state;

S2: pasting the sensors and the strain gauges equidistantly on the surface of the dynamic submarine cable based on test requirements, mounting the sensors at the connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and the strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, where extension and contraction of the bending actuator are controlled to control the dynamic submarine cable to swing left and right, so that an in-place working environment of the dynamic submarine cable in marine current of ocean is simulated;

S5: controlling, by the tension actuator, the connecting hinge to move by pulling the steel wire rope of the labor-saving pulley group, and driving the dynamic submarine cable to achieve axial loading with a constant tension;

where according to the test requirements, there are two types of tests, the first type of the two types of tests is fatigue test, which includes: first driving the tension actuator and the bending actuator to drive the dynamic submarine cable to perform the tension loading and bending swinging, finally causing the dynamic submarine cable to bear a tension load and a bending load;

the second type of the two types of tests is tension test, which includes: only allowing the tension actuator to move, then driving the dynamic submarine cable to perform a tension motion, and finally causing the dynamic submarine cable to bear the tension load.

in the two types of tests, the cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result;

the two types of tests are repeated for multiple times to reduce errors.

Compared with the prior art, some embodiments have the advantages as follows.

1. The test device of an embodiment is based on topological optimization. The main framework of the test device is designed to be lightweight. After optimization, the main framework of the test device is tower-like, which meets the strength requirement, reduces the weight, improves the material utilization rate, and makes the movement of the test device more convenient.
2. In an embodiment, the labor-saving pulley group is mounted between the tension actuator and the dynamic submarine cable, which can reduce the tonnage of the actuator required for loading and reduce the cost. Meanwhile, the labor-saving pulley group can compensate for the displacement of a fixed part at the lower end of the dynamic submarine cable during the swinging, so as to avoid the problem that the lower end of the dynamic submarine cable fails first. The labor-saving pulley group achieves the redundancy compatibility of lower end tension through the small displacement, so as to reduce its impact on the dynamic submarine cable and improve the reliability of the test data.
3. In an embodiment, two hydraulic actuator devices are placed on two sides of the bending table respectively to achieve the bending loading on the dynamic submarine cable. The design with two oil pressures on the two sides makes the test be more accurate and be easy to operate. Independent control can also achieve more different bending loading modes, and fatigue tests can be conducted on the dynamic submarine cable under different degrees of bending loads to simulate the influence of different marine environmental conditions on the bending behaviors of the dynamic submarine cable in more sea areas, so that the test data is more reliable.
4. The main framework of an embodiment is divided into four sections, each of which is formed by welding the open-cut profile steel. This ensures the safety and the economy.
5. The various groups of hydraulic actuator devices of an embodiment are independent of each other and can effectively control the application of the respective loads. Meanwhile, a loading sequence can be arbitrarily changed according to the engineering and design requirements.
6. The test device of an embodiment is the key equipment for the fatigue test on the dynamic submarine cable. Only a few companies in the world have the relevant research achievements of the test device, and this test device is still a first case in China. An embodiment can effectively break through the technological monopoly, fill the domestic blank, and provide a reliable test basis for the study of the fatigue performance of the dynamic submarine cable in China.
7. Compared with a horizontal fatigue test machine, the vertical fatigue test device can better simulate an actual working condition of the dynamic submarine cable, so that a measured and a fatigue strength error of measurement and calculation is reduced, and the influence of an additional gravity is avoided during the measurement.
8. During the calculation of the tension and bending loads in an embodiment, the gravity and the tension are in the same direction and can be regarded as a resultant force for calculation, so that the calculation is convenient, the data is accurate, and the fatigue strength of the dynamic submarine cable is more accurately analyzed.
9. The vertical fatigue test machine of an embodiment not only has the advantages of high control accuracy, high measurement accuracy, and good heat dissipation performance, but also has the advantages of convenient mounting of the dynamic submarine cable, a small occupied area, and the like when compared with the horizontal fatigue test machine.

Based on the above reasons, the present disclosure can be widely promoted in fields such as dynamic submarine cable testing.

BRIEF DESCRIPTION OF THE DRAWINGS

In order to illustrate the embodiments of the present disclosure or the technical solutions in the prior art more clearly, the drawings needed in the embodiments will be briefly introduced hereinafter. Apparently, the drawings in the following description are only some embodiments of the present disclosure. For those skilled in the art, other drawings can be obtained according to these drawings without paying creative labor.

Figure 1:
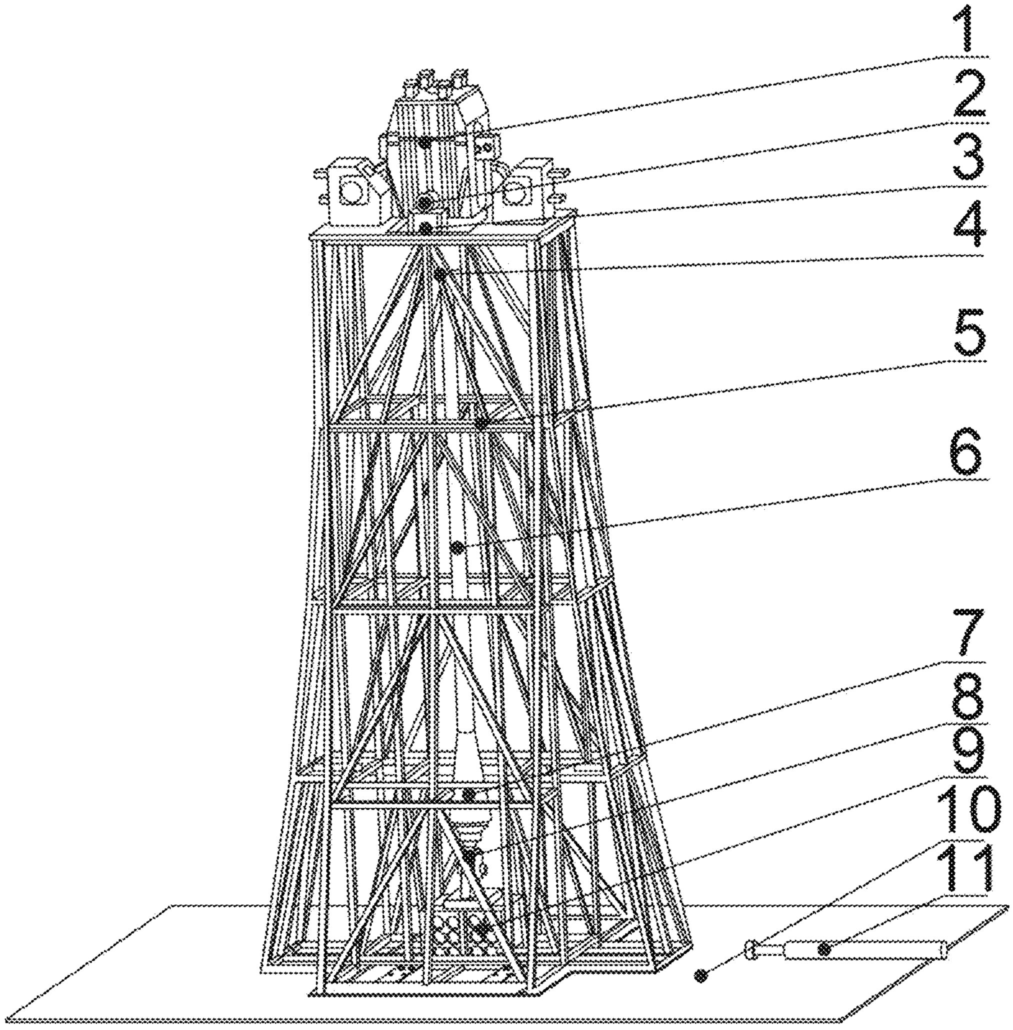
FIG. 1 is a schematic diagram of a main body structure of a vertical fatigue test device for a dynamic submarine cable based on a topology optimization design framework in a specific implementation of the present disclosure.

In the drawings: 1 bending table; 2 bearing; 3 bearing pedestal; 4 anti-bending device; 5 main framework; 6 dynamic submarine cable; 7 submarine cable fixing device; 8 connecting hinge; 9 supporting frame; 10 bottom plate; 11 tension actuator; 101 cover plate; 102 screw; 103 first bolt; 104 connecting rod; 105 second bolt; 106 rack; 107 bending actuator; 801 hinge hole; 802 hinged support; 803 lifting platform; 804 labor-saving pulley group; 1001 first bolt hole; 1002 second bolt hole; and 1003 third bolt hole.

DETAILED DESCRIPTION OF THE EMBODIMENTS

It should be noted that the embodiments of the present disclosure and features in the embodiments may be mutually combined without conflicts. The present disclosure will be described in detail below with reference to the accompanying drawings and the embodiments.

In order to make the objectives, technical solutions, and advantages of the embodiments of the present disclosure clearer, the technical solutions in the embodiments of the present disclosure are clearly described below with reference to the accompanying drawings in the embodiments of the present disclosure. Apparently, the described embodiments are merely some rather than all of the embodiments of the present disclosure. The following description of at least one exemplary embodiment is only for an illustrative purpose and shall not be construed as any limitation on the present disclosure and the application or use of the present disclosure. All other embodiments obtained by a person of ordinary skill in the art based on the embodiments of present disclosure without making creative efforts shall fall within the protection scope of present disclosure.

It should be noted that the terms used here are only for describing specific implementations and are not intended to limit the exemplary implementations according to the present disclosure. As used here, unless otherwise explicitly stated in the context, a singular form is also intended to include a plural form. In addition, it should also be understood that when the terms "include" and/or "comprise" are used in this specification, they indicate the existence of features, steps, operations, devices, assemblies, and/or combinations thereof.

Unless otherwise specified, the relative arrangement, numerical expressions, and numerical values of components and steps described in these embodiments do not limit the scope of the present disclosure. Meanwhile, it should be understood that for the convenience of description, the dimensions of each component shown in the accompanying drawings are not drawn according to actual proportional relationships. The techniques, methods, and equipment known to those of ordinary skill in the art may not be discussed in detail. In appropriate cases, the techniques, methods, and equipment should be considered as part of the authorization specification. In all the examples shown and discussed here, any specific values should be interpreted as merely exemplary, instead of being restrictive. Therefore, other examples of the exemplary embodiments may have different values. It should be noted that similar reference numerals and letters indicate similar items in the following drawings. Therefore, once a certain item is defined in one drawing, it is unnecessary to further discuss it in the subsequent drawings.

In the description of the present disclosure, it should be understood that the orientations or positional relationships indicated by directional terms such as "front, rear, upper, lower, left, right", "transverse, vertical, perpendicular, horizontal", and "top, bottom" are orientations or positional relationships shown in the accompanying drawings, only for the convenience of describing the present disclosure and simplifying the description. In the absence of contrary explanations, these directional terms do not indicate or imply that a device or element referred to needs to have a specific orientation or be constructed and operated in a specific orientation. Therefore, they cannot be understood as limiting the protection scope of the present disclosure. The directional terms "inside and outside" refer to the inside and outside of a contour relative to each component itself.

For ease of description, spatial relative terms such as "on", "above", "on an upper surface of", "at the top of", and the like can be used here to describe spatial positional relationships between a device or feature and other devices or features as shown in the figures. It should be understood that the spatial relative terms are intended to encompass different orientations of a device in use or operation other than those described in the figures. For example, if a device in the accompanying drawings is upside down, a device described as "above other devices or structures" or "on other devices or structures" will be located as being "below other devices or structures" or "beneath other devices or structures". Therefore, the exemplary term "above" can include two orientations: "above" and "below". The device can also be located in different ways (rotated 90 degrees or in other orientations), and the spatial relative description used here is explained correspondingly.

In addition, it should be noted that use of terms such as "first" and "second" to define parts is only for the purpose of distinguishing corresponding components. Unless otherwise stated, the above terms have no special meanings and cannot be understood as limiting the protection scope of the present disclosure.

The present disclosure provides a vertical fatigue test device for a dynamic submarine cable based on a topology optimization design framework, including:

a bending table 1, which can achieve purposes of testing and calculating the bending fatigue strength of the dynamic submarine cable 6 and is configured to swing periodically back and forth;

a main framework 5, which can not only provide supporting for the test device for the dynamic submarine cable and interfaces for mounting other devices, but also bear a bending moment, tension and compression loads generated by operations of actuators during testing;

hydraulic actuators, where the reciprocating periodic swinging of the bending table 1 and an axial tension on a lower end of the dynamic submarine cable 6 are provided by bending actuators 107 connected to left and right ends of the bending table 1 and a tension actuator 11 connected to a bottom plate 10, respectively;

a labor-saving pulley group 804, which includes pulleys and a steel wire rope and configured to change a placement direction of the tension actuator 11 at the bottom, changing from vertical loading to horizontal loading, which reduces the overall height of the test device, and meanwhile, the labor-saving pulley group 804 reduces half of a load on the tension actuator 11; moreover, the labor-saving pulley group can be configured to compensate for a small displacement generated by the reciprocating swinging of the bending table 1 at a fixed part of a lower end of the dynamic submarine cable 6;

an anti-bending device 4, configured to restrain a sudden curvature change of the dynamic submarine cable 6 in a process of bearing an alternating stress, and simulate an in-place mounting state of the dynamic submarine cable 6.

The bending table 1 is of a solid-web frame structure and is located at the topmost end of the vertical fatigue test machine. The bending actuators 107, as power ends, are connected to the bending table 1 through gear and rack transmission, and a hinged support on the main framework 5, so that the reciprocating swinging is achieved through a half gear and rack transmission mechanism, so as to simulate an effect of applying a bending load to the dynamic submarine cable 6 in a marine environment and a bending torque brought by marine current in the ocean to the dynamic submarine cable 6. The bending table 1 is connected with the main framework 5 through a shaft. Firstly, a bearing pedestal 3 that meets a requirement is welded on the main framework 5, and the bending table 1 is hinged to the main framework 5 through the shaft. One end of the dynamic submarine cable 6 is fixed to an end portion of the bending table 1 through a clamping mechanism and a bolt.

The main framework 5 is formed by welding open-cut profile steel and plays a supporting role in the entire device. The two bending actuators 107 (hydraulic actuators) and the bending table 1 are mounted and fixed at an upper end of the main framework 5. A bottom plate 10 for bearing a load is mounted at a lower end of the main framework 5. They are fixed to the bottom plate 10 by bolting. A connector is mounted at one end of the dynamic submarine cable 6 and is connected with the labor-saving pulley group 804 at the bottom. Due to test requirements, a center of the bending table 1 of the test machine is subjected to a vertical downward tension, and a force transferring path is a downwards expanded triangular truss supporting structure. Therefore, the topology optimization main framework 5 is composed of a triangular truss structure, which is overall tower-like. The purpose of reducing the weight is also achieved on the premise of guaranteeing the safety.

The hydraulic actuators provide power sources for the reciprocating periodic swinging of the bending table 1 and longitudinal tension loading of the dynamic submarine cable 6. Providing the power hydraulically can simulate a bending load and tension load applied by the marine environment to the dynamic submarine cable 6.

The anti-bending device 4 is of a three-section structure made of polyurethane and epoxy resin. Its main function is to prevent an excessive curvature of the dynamic submarine cable 6. The alternating stress on a connection at the upper end of the dynamic submarine cable 6 is maximum, so that this connection is most likely to have a fatigue rupture. Therefore, the anti-bending device 4 needs to be mounted at the end of the dynamic submarine cable 6 to protect the dynamic submarine cable 6 by limiting the curvature.

The dynamic submarine cable 6 is of a multilayer helical wound composite structure, a material of which is composed of steel, copper, polyethylene, polypropylene, polytetrafluoro, and the like.

An information monitoring system of the test device includes sensors, cameras, related data analysis software, and the like. Test data is acquired and transmitted through strain gauges and sensors on a surface of dynamic submarine cable 6, so as to analyze a stress on and a fatigue failure of the dynamic submarine cable 6. The entire test equipment and the entire test process are recorded through the cameras for detailed analysis after tests are completed.

The test device is mounted, and it is necessary to ensure that the dynamic submarine cable 6 is in a vertical state.

The sensors and the strain gauges are equidistantly pasted on the dynamic submarine cable 6.

The test device is assembled with the sensors. The fatigue test device is inspected and debugged: The hydraulic actuators are loaded to achieve small-amplitude loading on the bending table 1 and a tension device. A strain data curve is recorded. After the above requirements are met, the following tests can be carried out:

1. The bending actuators 107 are driven to drive the bending table 1 to swing in a reciprocating manner at 30° to the left and 30° to the right. Meanwhile, the tension actuator 11 is driven to perform tension loading to enable the dynamic submarine cable 6 to bear a tension of 60 tons, so that a fatigue test is carried out on the dynamic submarine cable 6.
2. The bending actuators 107 are controlled to keep the bending table 1 vertical. The tension actuator 11 is driven to apply a tension of 60 tons to the dynamic submarine cable 6. A tension test is carried out on the dynamic submarine cable 6.

In the above test process, the entire deformation process of the dynamic submarine cable 6 is recorded by the cameras, and the sensors and the strain gauges are used to transmit the data to a computer. The data analysis software is used for analysis and recording. Finally, theoretically calculated results and software calculated results are compared to obtain fatigue strength and a life limit of the dynamic submarine cable 6.

Embodiment 1

Figure 2:
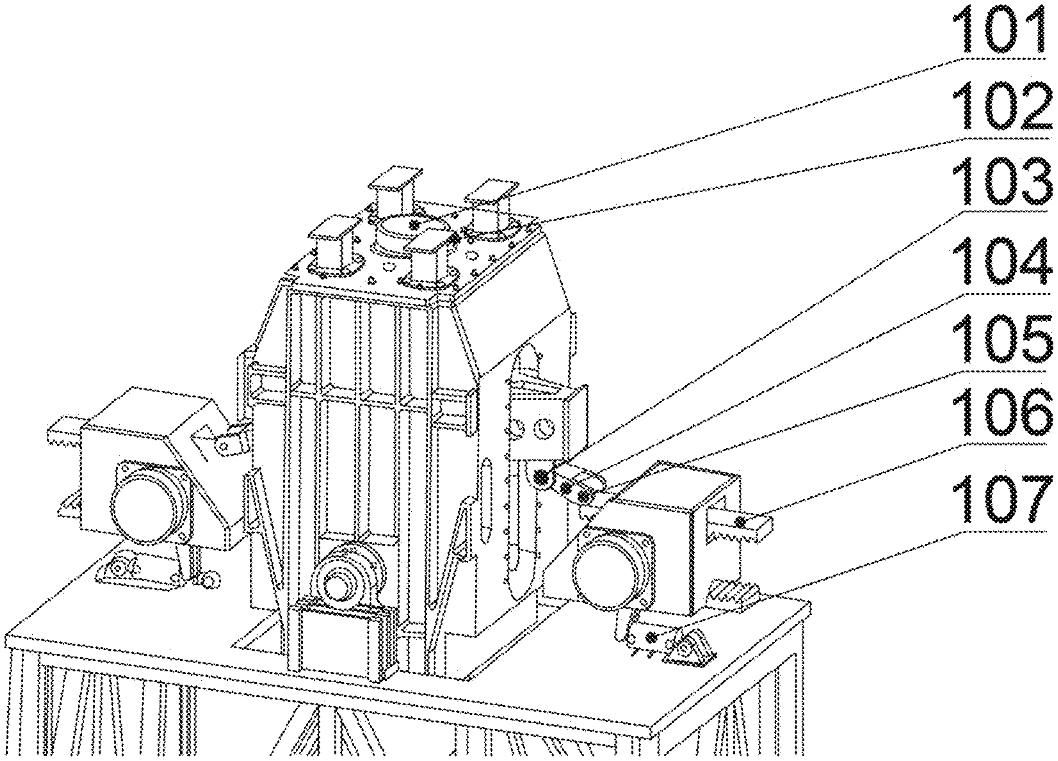
FIG. 2 is a schematic diagram of a partially cross-sectional view of a bending table of a vertical fatigue test device for a dynamic submarine cable based on a topology optimization design framework in a specific implementation of the present disclosure.
Figure 3:
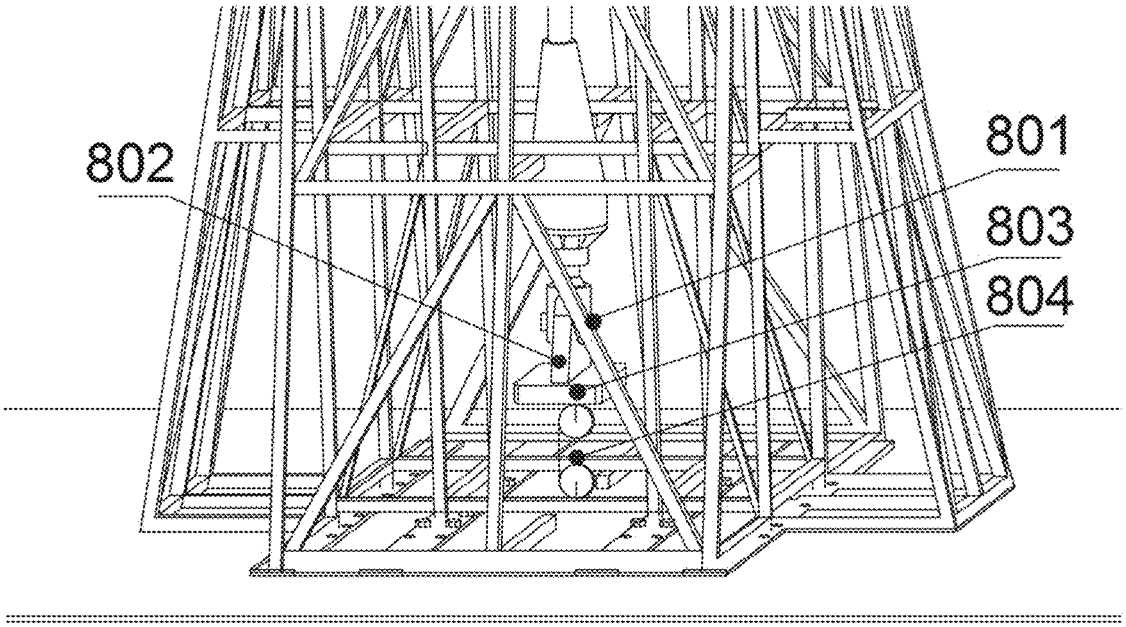
FIG. 3 is a schematic diagram of a tension device of a vertical fatigue test device for a dynamic submarine cable based on a topology optimization design framework in a specific implementation of the present disclosure.
Figure 4:
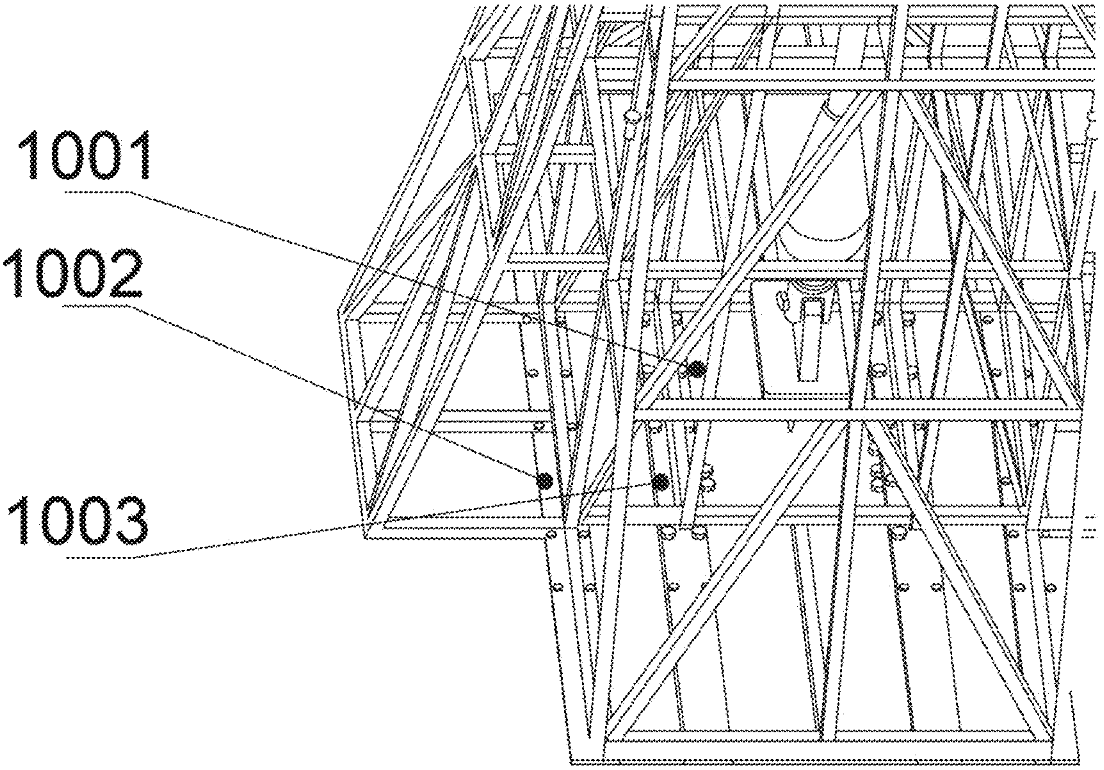
FIG. 4 is a schematic diagram of a bottom plate of a vertical fatigue test device for a dynamic submarine cable based on a topology optimization design framework in a specific implementation of the present disclosure.

As shown in FIG. 1 to FIG. 4, a vertical fatigue test device for a dynamic submarine cable based on a topology optimization design framework includes a vertical fatigue test machine. The vertical fatigue test machine includes a bending table 1, a main framework 5, and a dynamic submarine cable 6.

One end of the main framework 5 is connected with the bending table 1 through a bearing 2 fixed on a bearing pedestal 3, and the other end of the main framework 5 is connected with a bottom plate 10 through four rows of second bolt holes 1002 and four rows of third bolt holes 1003. The bottom plate 10 is connected with a supporting frame 9 through a bolt in a first bolt hole 1001. A connecting hinge 8 capable of sliding up and down is mounted in the supporting frame 9. An upper part of the connecting hinge 8 is connected with the dynamic submarine cable 6 through a submarine cable fixing device 7, and a lower part of the connecting hinge 8 is connected with a tension actuator 11 through a labor-saving pulley group 804. An open-cut profile steel truss structure (the main framework 5) assembled by welding has good stability and saves materials. Upper and lower parts of the main framework 5 are provided with cameras for recording real-time working conditions and changes of the dynamic submarine cable 6 and the fatigue test machine.

The bending table 1 is mainly composed of a solid-web framework structure, and is connected with the main framework 5 through the bearing 2 and the bearing pedestal 3. A cover plate 101 at an upper end of the bending table 1 is fixed on the bending table 1 by four screws 102. The dynamic submarine cable 6 can be mounted and removed when the cover plate 101 is opened. Each of bending mechanisms at left and right ends of the bending table 1 includes a gear and rack mechanism. A rack 106 in the gear and rack mechanism is connected with a connecting rod 104 through a second bolt 105, and the connecting rod 104 is further connected with the bending table 1 through a first bolt 103. A lower end of the gear and rack mechanism is fixed to an upper plate of the main framework 5 by screws. An anti-bending device 4 is mounted at a connection of the dynamic submarine cable 6 and the bending table 1. The anti-bending device 4 protects the dynamic submarine cable 6 by limiting a curvature of the dynamic submarine cable 6.

The bottom plate 10 is fixed to the supporting frame 9 through the bolts in the first bolt hole 1001. The bottom plate 10 is fixed to the main framework 5 through the bolts in the second bolt holes 1002, and the third bolt holes 1003. An axial displacement of the dynamic submarine cable 6 is controlled on the supporting frame 9 through a lifting platform 803. A hinged support 802 is fixed to a connecting hinge 8 through a bolt in a hinge hole 801, and the connecting hinge 8 transfers a tension to the dynamic submarine cable 6. A labor-saving pulley group 804 is mounted below the connecting hinge 8. The tension actuator 11 is connected with a steel wire rope at one end of the labor-saving pulley group 804. The tension actuator 11 controls the labor-saving pulley group 804 to achieve a displacement motion of the connecting hinge 8, so as achieve tension loading on the dynamic submarine cable 6. Meanwhile, the labor-saving pulley group 804 can compensate for a small displacement generated at a lower end of the dynamic submarine cable 6 when the bending table 1 swings. The labor-saving pulley group 804 includes two pulleys and a steel wire rope. One end of the steel wire rope is fixedly connected to the lower pulley of the two pulleys and is wound on the two pulleys, and the other end of the steel wire rope is connected with the tension actuator 11. The upper pulley of the two pulleys is connected with the lifting platform 803, and the lower pulley is connected with the bottom plate 10.

A test method implemented by a vertical fatigue test on a dynamic submarine cable by using the above test device includes the following steps.

All parts and mechanisms are assembled to obtain the test device. The bending actuators 107 and the supporting frame 9 are connected to the upper plate and bottom plate 10, respectively, and all the actuators are turned off. The corresponding actuators are adjusted according to motion modes required in each test. The upper end of the dynamic submarine cable 6 is fixed to the bending table 1 through the clamping mechanism, and the lower end is connected to the tension actuator 11 through the connecting hinge 8. The tension actuator 11 is adjusted to pull the labor-saving pulley group 804 to ensure that the dynamic submarine cable 6 is in a vertical state.

Due to test requirements, the sensors and the strain gauges are equidistantly pasted on the surface of the dynamic submarine cable 6. The sensors are mounted at the connection between the dynamic submarine cable 6 and the bending table 1, and at a connection between the dynamic submarine cable 6 and the tension actuator 11, and whether the various sensors are firmly pasted and mounted are finally determined to prevent the sensors from falling off during the test, as the falling of the sensors affects acquisition of test data.

After the above sensors and strain gauges are mounted, preliminary debugging needs to be performed for the test device. That is, small-amplitude loading is performed on the dynamic submarine cable 6 through the bending actuators 107 and the tension actuator 11, and the records of the sensors are observed. The test can be started after test requirements are met.

The bending actuators 107 are controlled to move, and the bending table 1 begin to swing, which drives the dynamic submarine cable 6 to swing left and right, and bending loading on the dynamic submarine cable 6 is finally completed. The extension and contraction of the bending actuators 107 are controlled to control the dynamic submarine cable 6 to swing left and right, so that an in-place working environment of the dynamic submarine cable 6 in marine current of the ocean is simulated.

The tension actuator 11 controls the connecting hinge 8 to move by pulling the steel wire rope of the labor-saving pulley group 804, so as to drive the dynamic submarine cable 6 to achieve axial loading with a constant tension.

According to the test requirements, there may be approximately two types of tests as follows.

The first type is fatigue test, which includes: first driving the tension actuator 11 and the bending actuators 107 to drive the dynamic submarine cable 6 to perform tension loading and bending swinging, finally causing the dynamic submarine cable 6 to bear a tension load and a bending load.

The second type is tension test, which includes: only allowing the tension actuator 11 to move, then driving the dynamic submarine cable 6 to perform a tension motion, and finally causing the dynamic submarine cable 6 to bear a tension load.

In the above tests, the camera located on the main framework 5 captures an entire deformation process of the dynamic submarine cable 6; meanwhile, the data acquired from the sensors and the strain gauges are analyzed and processed through relevant software to obtain an analyzed and processed result; finally, a theoretical calculation result is compared with the analyzed and processed result; a force condition and lifespan of the dynamic submarine cable 6 are obtained by combining the theoretical calculation result and the analyzed and processed result.

The above tests can be repeated for multiple times to reduce errors.

The present disclosure can precisely control and operate the hydraulic actuator systems through a self-compiled program. In addition, motion output data is recorded to facilitate error adjustment and ensure the motion accuracy.

It should be finally noted that: The foregoing various embodiments are merely intended to describe the technical solutions of the present disclosure, but not for limiting the present disclosure. Although the present disclosure is described in detail with reference to the foregoing various embodiments, persons of ordinary skill in the art should understand that they may still make modifications to the technical solutions described in the foregoing embodiments or make equivalent replacements to partial or all technical features thereof. However, these modifications or replacements do not make the essence of the corresponding technical solutions depart from the scope of the technical solutions of the various embodiments of the present disclosure.

What is claimed is:

1. A vertical fatigue test device for a dynamic submarine cable based on a topology optimization design framework, comprising: a bending table, a main framework, the dynamic submarine cable, a connecting hinge, a supporting frame, a bottom plate, and a tension actuator, wherein the bending table is mounted on an upper plate at a top of the main framework, and the main framework, the supporting frame, and the tension actuator are mounted on the bottom plate; the dynamic submarine cable is vertically arranged in an inner space of the main framework;

an upper end of the dynamic submarine cable is connected with the bending table through a clamping mechanism; each of a left end and a right end of the bending table is connected with a bending actuator; the bending actuator is connected to the upper plate and is configured to achieve reciprocating swinging of the bending table, so as to achieve bending loading on the dynamic submarine cable;

a lower end of the dynamic submarine cable is connected with the connecting hinge; the connecting hinge is slidably connected to the supporting frame; and the tension actuator is connected with the connecting hinge and is configured to achieve a displacement motion of the connecting hinge, so as to achieve tension loading on the dynamic submarine cable.

2. The vertical fatigue test device for the dynamic submarine cable based on the topology optimization design framework according to claim 1, wherein the bending table is of a solid-web framework structure and is connected with the bending actuator through a bending mechanism; and the bending actuator is connected with a hinged support on the main framework.

3. A test method implemented by the vertical fatigue test device for the dynamic submarine cable based on the topology optimization design framework according to claim 2, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

4. The vertical fatigue test device for the dynamic submarine cable based on the topology optimization design framework according to claim 2, wherein the bending mechanism comprises a connecting rod and a rack and gear mechanism; the gear and rack mechanism comprises at least a gear and a rack; one end of the connecting rod is connected to the bending table through a first bolt, and another end of the connecting rod is connected to the rack through a second bolt; the rack meshes with the gear; the gear is connected to the bending actuator; and a lower end of the gear and rack mechanism is fixed to the upper plate of the main framework by screws.

5. A test method implemented by the vertical fatigue test device for the dynamic submarine cable based on the topology optimization design framework according to claim 4, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

6. The vertical fatigue test device for the dynamic submarine cable based on the topology optimization design framework according to claim 1, wherein an upper part of the connecting hinge is connected with the lower end of the dynamic submarine cable through a submarine cable fixing device; the connecting hinge comprises a hinge hole, a hinged support, a lifting platform, and a labor-saving pulley group; the lifting platform is slidably connected to the supporting frame; the hinged support is fixed to the lifting platform; the hinge hole is formed in the hinged support; the hinge hole is connected with the submarine cable fixing device through an internal matched bolt; a lower part of the lifting platform is connected with the labor-saving pulley group; the labor-saving pulley group comprises two pulleys and a steel wire rope; one end of the steel wire rope is fixedly connected to a lower pulley of the two pulleys and is wound on the two pulleys, and another end of the steel wire rope is connected to the tension actuator; an upper pulley of the two pulleys is connected with the lifting platform; the lower pulley is connected with the bottom plate;

the tension actuator is configured to control the labor-saving pulley group to achieve a displacement motion of the connecting hinge, so as to achieve the tension loading on the dynamic submarine cable; and meanwhile, the labor-saving pulley group is configured to compensate for a displacement generated at the lower end of the dynamic submarine cable when the bending table swings.

7. A test method implemented by the vertical fatigue test device for the dynamic submarine cable based on the topology optimization design framework according to claim 6, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull the labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling the steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

8. The vertical fatigue test device for the dynamic submarine cable based on the topology optimization design framework according to claim 1, wherein the bending table is connected to the main framework through a shaft; a bearing pedestal is welded to the upper plate of the main framework; a bearing is mounted inside the bearing pedestal; the bearing is in fitting connection to the shaft connected to the bending table; an upper end of the bending table is provided with a cover plate; the cover plate is fixed to the bending table by a plurality of screws; and the dynamic submarine cable is able to be mounted and removed by opening the cover plate.

9. A test method implemented by the vertical fatigue test device for the dynamic submarine cable based on the topology optimization design framework according to claim 8, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

10. The vertical fatigue test device for the dynamic submarine cable based on the topology optimization design framework according to claim 1, wherein an anti-bending device is mounted at a connection between the dynamic submarine cable and the bending table; the anti-bending device is of a three-section structure; and a material of the three-section structure comprises polyurethane and epoxy resin.

11. A test method implemented by the vertical fatigue test device for the dynamic submarine cable based on the topology optimization design framework according to claim 10, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at the connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

12. The vertical fatigue test device for the dynamic submarine cable based on the topology optimization design framework according to claim 1, wherein both the bending actuator and the tension actuator are hydraulic actuators.

13. A test method implemented by the vertical fatigue test device for the dynamic submarine cable based on the topology optimization design framework according to claim 12, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result;

the two types of tests are repeated for a plurality of times to reduce errors.

14. The vertical fatigue test device for the dynamic submarine cable based on the topology optimization design framework according to claim 1, wherein the main framework is welded by open-cut profile steel and is composed of a triangular truss structure; the main framework is overall a tower-like triangular truss supporting structure;

a first bolt hole is formed in a lower end of the supporting frame; a plurality of rows of second bolt holes and a plurality of rows of third bolt holes are formed in a lower end of the main framework; the main framework is connected with the bottom plate by bolts that are in fitting connection into the second bolt holes and the third bolt holes; and the supporting frame is connected with the bottom plate through a bolt that is in fitting connection into the first bolt hole.

15. A test method implemented by the vertical fatigue test device for the dynamic submarine cable based on the topology optimization design framework according to claim 14, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

16. The vertical fatigue test device for the dynamic submarine cable based on the topology optimization design framework according to claim 1, further comprising an information monitoring system, wherein the information monitoring system comprises at least sensors, cameras, and data analysis software; the sensors are mounted on a surface of the dynamic submarine cable; strain gauges are further mounted on the surface of the dynamic submarine cable; the sensors and the strain gauges are equidistantly pasted on the dynamic submarine cable and are electrically connected with an upper computer; test data is acquired and transmitted to the upper computer through the strain gauges and the sensors; the data analysis software is configured to analyze a stress and fatigue failure of the dynamic submarine cable; cameras are mounted at an upper end and a lower end of the main framework, and real-time working conditions and changes of the dynamic submarine cable (6) and a fatigue test machine are recorded through the cameras.

17. A test method implemented by the vertical fatigue test device for the dynamic submarine cable based on the topology optimization design framework according to claim 16, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on the surface of the dynamic submarine cable based on test requirements, mounting the sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of the test data;

S3: after mounting the sensors and the strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling a steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, the cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

18. A test method implemented by the vertical fatigue test device for the dynamic submarine cable based on the topology optimization design framework according to claim 1, comprising following steps:

S1: assembling parts and mechanisms to obtain the test device: connecting the bending actuators and the supporting frame to the upper plate and the bottom plate of the main framework, respectively, turning off the bending actuator and the tension actuator, adjusting the bending actuator and the tension actuator according to a motion mode required in each test, fixing the upper end of the dynamic submarine cable to the bending table through the clamping mechanism, connecting the lower end of the dynamic submarine cable to the tension actuator through the connecting hinge, and adjusting the tension actuator to pull a labor-saving pulley group so as to ensure that the dynamic submarine cable is in a vertical state;

S2: pasting the sensors and the strain gauges equidistantly on a surface of the dynamic submarine cable based on test requirements, mounting sensors at connection between the dynamic submarine cable and the bending table, and at a connection between the dynamic submarine cable and the tension actuator, and finally determining whether the sensors are firmly pasted and mounted to prevent the sensors from falling off during a test, as the falling of the sensors affects acquisition of test data;

S3: after mounting the sensors and strain gauges, completing preliminary debugging of the test device: performing small-amplitude loading on the dynamic submarine cable through the bending actuator and the tension actuator, observing records of the sensors, and starting the test after the test requirements are met;

S4: controlling the bending actuator to move, causing the bending table to begin to swing, so as to drive the dynamic submarine cable to swing left and right, and finally completing the bending loading on the dynamic submarine cable, wherein extension and contraction of the bending actuator are controlled to control the dynamic submarine cable to swing left and right, so that an in-place working environment of the dynamic submarine cable in marine current of ocean is simulated; and S5: controlling, by the tension actuator, the connecting hinge to move by pulling steel wire rope of the labor-saving pulley group, and driving the dynamic submarine cable to achieve axial loading with a constant tension;

wherein according to the test requirements, there are two types of tests, the first type of the two types of tests is fatigue test, which comprises: first driving the tension actuator and the bending actuator to drive the dynamic submarine cable to perform the tension loading and bending swinging, finally causing the dynamic submarine cable to bear a tension load and a bending load;

the second type of the two types of tests is tension test, which comprises: only allowing the tension actuator to move, then driving the dynamic submarine cable to perform a tension motion, and finally causing the dynamic submarine cable to bear the tension load;

in the two types of tests, cameras located on the main framework capture an entire deformation process of the dynamic submarine cable; meanwhile, the test data acquired from the sensors and the strain gauges are analyzed and processed through relevant software to obtain an analyzed and processed result; finally, a theoretical calculation result is compared with the analyzed and processed result; a force condition and lifespan of the dynamic submarine cable are obtained by combining the theoretical calculation result and the analyzed and processed result; and the two types of tests are repeated for a plurality of times to reduce errors.

* * * * *